US008888484B2

United States Patent
Ammer et al.

(10) Patent No.: US 8,888,484 B2
(45) Date of Patent: Nov. 18, 2014

(54) GUIDE SHOE FOR A GUIDING DEVICE OF A PLASTIC PROCESSING MACHINE CLAMPING UNIT

(75) Inventors: Daniel Ammer, München (DE); Volker Pihan, Tutzing (DE); Georg Krabichler, Pfaffenhofen (DE)

(73) Assignee: Kraussmaffei Technologies GmbH, München (DE)

( * ) Notice: Subject to any disclaimer, the term of this patent is extended or adjusted under 35 U.S.C. 154(b) by 0 days.

(21) Appl. No.: 14/125,490

(22) PCT Filed: May 21, 2012

(86) PCT No.: PCT/EP2012/059382
§ 371 (c)(1),
(2), (4) Date: Dec. 11, 2013

(87) PCT Pub. No.: WO2012/175261
PCT Pub. Date: Dec. 27, 2012

(65) Prior Publication Data
US 2014/0113022 A1   Apr. 24, 2014

(30) Foreign Application Priority Data
Jun. 18, 2011   (DE) .......................... 10 2011 104 535

(51) Int. Cl.
| B29C 45/17 | (2006.01) |
| B29C 43/34 | (2006.01) |
| B29C 43/00 | (2006.01) |

(52) U.S. Cl.
CPC .............. *B29C 45/1761* (2013.01); *B29C 43/34* (2013.01); *B29C 2043/3438* (2013.01); *B29C 2043/3433* (2013.01); *B29C 43/003* (2013.01)
USPC .......................................... 425/589; 425/472

(58) Field of Classification Search
CPC .................... B29C 45/1761; B29C 2045/1763
USPC ........................................ 425/450.1, 472, 589
See application file for complete search history.

(56) References Cited

U.S. PATENT DOCUMENTS

| 4,453,912 A | * | 6/1984 | Hehl | ............................. 425/589 |
| 5,297,952 A | * | 3/1994 | Leonhartsberger | ........... 425/593 |

(Continued)

FOREIGN PATENT DOCUMENTS

| DE | 41 41 259 | 6/1993 |
| DE | 44 03 079 | 4/1995 |

(Continued)

OTHER PUBLICATIONS

International Search Report issued by the European Patent Office in International Application PCT/EP2012/059382 on May 21, 2012.

*Primary Examiner* — James MacKey
(74) *Attorney, Agent, or Firm* — Henry M. Feiereisen LLC (57) ABSTRACT

A guide shoe of a guiding device of a plastic processing machine clamping unit has an elongated main part in clamping direction for attachment of sliding and/or rolling elements. The guide shoe has a connecting element which is spaced from the main part and extends substantially vertically in the clamping direction, and which has a fixing region for fixing the guide shoe to a moving mold platen. The moving mold platen can be fixed solely to the fixing region of the connecting element in decoupled manner from the main part. The connecting element is designed as a deformation element fixed to the main part via a connecting region that forms a target bending zone with respect to a bend about a bending axis substantially parallel to the clamping direction, such that the deformation element additionally forms a target torsion zone about a torsion axis substantially perpendicular to the clamping direction.

13 Claims, 3 Drawing Sheets

(56) References Cited

U.S. PATENT DOCUMENTS

| | | | |
|---|---|---|---|
| 5,314,327 A | | 5/1994 | Stein |
| 5,328,346 A | * | 7/1994 | Kodric .................... 425/589 |
| 5,454,709 A | * | 10/1995 | Leonhartsberger et al. .. 425/589 |
| 5,547,367 A | | 8/1996 | Stein |
| 6,896,508 B2 | | 5/2005 | Krüger et al. |

FOREIGN PATENT DOCUMENTS

| | | |
|---|---|---|
| DE | 196 08 135 | 9/1997 |
| JP | 2003-071894 | 3/2003 |
| JP | 2009-262514 | 11/2009 |
| WO | WO 02/30650 | 4/2002 |

* cited by examiner

GUIDE SHOE FOR A GUIDING DEVICE OF A PLASTIC PROCESSING MACHINE CLAMPING UNIT

CROSS-REFERENCES TO RELATED APPLICATIONS

This application is the U.S. National Stage of International Application No. PCT/EP2012/059382, filed May 21, 2012, which designated the United States and has been published as International Publication No. WO 2012/175261 and which claims the priority of German Patent Application, Serial No. 10 2011 104 535.3, filed Jun. 18, 2011, pursuant to 35 U.S.C. 119(a)-(d).

BACKGROUND OF THE INVENTION

The invention relates to a guide shoe for a guiding device of a clamping unit of a plastic processing machine, in particular for a clamping unit of a two-platen injection molding machine with tension columns. The invention is described below by way of example by means of an injection molding machine. However, it is not restricted to this, and can be transferred to other plastic processing machines which have a linearly guided clamping unit.

In injection molding machines, the two mold halves of an injection mold are received respectively via a fixed mold platen and via a moving mold platen, which during the injection molding cycle are moved towards one another or away from one another. The fixed mold platen is fastened here in a stationary manner on the injection molding machine. The opening and closing of the mold is brought about via the moving mold platen. The direction of movement of the moving mold platen is therefore designated as the clamping direction of the injection molding machine and runs in longitudinal direction thereof. If is often also defined as X-direction or as X-axis of the injection molding machine and of the injection molding components, as it also represents the (main) demolding direction for the injection molding process. The Y-axis runs accordingly horizontally transversely to the clamping direction, so that the vertical axis of the injection molding machine represents the Z-axis.

The closing of the mold and the application of the closing forces for the mold takes place in modern injection molding machines via tension columns which have the task of transferring the very high forces for closing the tool onto the mold.

In modern injection molding machines, the tension columns have no guiding function for the mold platens and they are "merely" responsible for applying the closing forces. For the guidance of the moving mold platen, guiding devices are usually provided, on which great requirements are placed with regard to accuracy of guidance and loading capacity.

For a short cycle time of the injection molding process, it is important to be able to move the moving mold platen to and fro in X-direction at as high a speed as possible between the opened and the closed positions of the injection mold. For this, the moving mold platen is usually guided in clamping direction via guide rails which are uncoupled from the linear drive. In this respect, great requirements with regard to ease of mobility and rigidity are placed on the guide rails or respectively on the guide shoes which slide on the guide rails, so that the moving mold half can be guided in a parallel manner on the moving mold platen or respectively on the mold platen with the maximum precision and at high speeds and at high accelerations. For this, in addition to a low friction of the sliding- or rolling elements of the guide shoes on the guide rail, also a high degree of rigidity of the guide shoes is necessary with respect to bending/tilting about the Y-axis and in Z-direction, wherein moving masses are to be minimal.

The high acceleration values are reached especially on the transition from the open position of the tool into the fast motion for the drawing near of the two mold halves and on braking from the fast motion into the actual closing movement and in the corresponding reversed movement sequences.

Shortly before reaching the closed position, the moving mold half is braked, so that a misalignment, which is possibly present between the two mold halves, must be compensated by suitable compensating means in the non-fast motion. This braking in fact causes high tilting moments of the moving mold platen about the Y-axis with respect to the guides, which can be received by rigid guide shoes. For this, these usually have an elongated shape in X-direction.

With a compensating of any minimal misalignments which may be present between the two mold halves in Y- and/or in Z-direction, tensions occur in the mold platens, which in the case of the moving mold platen are transferred to the guiding devices if no possibility for compensation is provided for this.

After reaching the closed position, i.e. still before the mold is filled, the closing force is applied onto the two mold platens, so that the two mold halves are not pressed apart by the filling of the mold. Here, the mold platens are deformed minimally under the effect of the closing force. The deformation has its greatest effect on the marginal regions of the platen.

The above-mentioned deformation of the mold platens results on the one hand from the applied closing force and proportionately also from the applied injection pressure on injecting of the plasticized plastic material.

Therefore, a deformation of the mold platens is understood below to mean a minimal elastic deformation (lying in the hundredths and tenths of a millimeter range) by application of the closing force and/or of the injection pressure.

By introduction of the plastic material with injection pressure for filling the mold, the two mold platens are deformed minimally by the high injection pressure necessary for this. Injection pressures of 1000 bar and above are entirely usual here. The convex deformation of the mold which occurs here is passed on to the mold platens, wherein these deformations, in particular on the moving platen, are usually transferred, i.e. in the prior art, to the guiding elements, i.e. to the guide shoes and for the most part also to the guide rails. However, according to the conventional prior art deformations on the guiding elements are to be avoided, so that a good linear guidance is achieved. This has the result that the guiding elements are accordingly constructed to be rigid and robust and therefore generally very solid, so that the deformations on the moving mold platen and on the guiding elements are kept small, in order to thus avoid damage to the guiding elements, in particular to the guide rails.

Only an exact as possible parallelity of the two mold platens and hence of the two mold halves can ensure an optimum part quality, a high part number with short cycle times. Furthermore, a high service life of the injection mold and also of the injection molding machine can only be achieved when the two mold halves are held precisely parallel to one another. The better the parallelity of the mold platens can be maintained, the lower is the tool wear and the accompanying damage to the tool and to the guiding elements.

A great importance is therefore given to the guiding elements for moving mold platens, which are usually arranged in Z-direction beneath the moving mold platen and are present once in each case per side on the injection molding machine. They must guarantee a high movement speed of the moving mold platen and at the same time be able to receive high tilting moments on accelerating or respectively braking of the mold half. In addition, they must receive tensions which can occur when the two mold halves draw close to one another shortly before and in the closed position owing to small misalignments of the two mold halves. Furthermore, the guiding devices must be able to receive deformations of the moving platen which occur when closing force is built up and the mold is acted upon with injection pressure. All these stresses are to be received by the guiding elements so that damage, in particular to the sliding/rolling elements and/or to the guide rail, is avoided.

A mold clamping device is known from DE 41 41 259 A1, which can compensate small misalignments between the mold halves in closed position and also transversely to the clamping direction and in height direction, i.e. in vertical direction, by a limited displaceability of the moving mold platen.

The moving mold platen is mounted here in a floating manner on a machine slide, such that the moving mold platen has a small freedom of movement in longitudinal direction of the injection molding machine or respectively in vertical direction of the injection molding machine. A compensation in transverse direction takes place by deformation of pressure bolts, which support the moving platen in Z-direction. Through this arrangement, tensions on closing of the two mold halves are avoided, because the two mold halves are moved towards each other in an almost parallel manner by the floating mounting of the moving mold half.

However, an equalization or respectively a compensation of the tensions which occur under closing force and on filling of the mold by the injection pressure, is not possible with the device according to DE 41 41 259 A1.

In DE 44 03 079 C1 a possible inclination about the Y-axis of the moving mold platen is compensated by a compensating mechanism in the machine slide. For this, the machine slide has guide rollers mounted in an oscillating manner, which compensate the inclination.

Also in this possibility for compensation, a compensating of the tensions which occur by closing force and on filling of the mold by the injection pressure, is not possible. In addition, this device does not provide any compensation for misalignments in the Y- and/or Z-direction.

For compensating the deformations of the moving mold platen on introducing the injection pressure onto the closed mold, DE 196 08 135 A1 proposes preferably configuring the moving mold platen from a thin clamping part and a thicker force transmission part, so that deformations which are brought about by the injection pressure, are absorbed by the thinner layer of the mold platen. In so doing, the thinner layer of the mold platen deforms, which is connected by pressure elements in a decoupled manner with the thicker force transmission layer of the moving mold platen. This complex configuration of the moving mold platen results not only in high manufacturing costs for the injection molding machine, but requires furthermore a solid and expensive configuration of the moving mold platen, whereby high acceleration- or respectively deceleration forces are necessary.

This, in turn,—if one does not wish to accept any extension to the cycle time—leads to substantially greater and stronger drive units, which additionally increase the costs of the injection molding machine and impair the energy balance.

SUMMARY OF THE INVENTION

It is therefore an object of the invention to provide a guiding device for a clamping unit for an injection molding machine which reliably prevents the tilting of the moving mold platen during the movement of the moving mold half or respectively on its acceleration or braking, and ensures a high mold platen parallelity during the mold closing process of the fixed and the moving mold platen, and does not transfer, or only transfers to a limited extent, to the guiding system deformations of the injection mold which occur by introduction of the closing force and of the injection pressure. At the same time, the guiding unit is to be produced at a favorable price and the moving masses are to be kept to a minimum, to avoid an increased cycle time.

Furthermore, it is an object of the invention to provide a guiding device which is easily accessible in the case of damage, i.e. is easy to service and, if applicable, can be easily exchanged.

The problem is solved by a guide shoe of a guiding device for a guidance of a clamping device of a plastic processing machine according to claim 1. Advantageous embodiments of the guide shoe according to the invention are indicated in the subclaims.

The guide shoe according to the invention consists substantially of two principal components, a main part to receive sliding- or respectively rolling elements and a connecting element, constructed as deformation element, with a connecting region which connects the main part with the connecting element, which can receive the mechanical deformations and displacements of the moving mold platen.

To avoid tilting movements of the moving mold platen during the movement of the platen, in particular during the accelerating or respectively braking of the mold platen, the guide shoe is constructed so as to be elongated, whereby a great lever is provided against tilting moments about the Y-axis. Provision is made here that the guide shoe can receive sliding elements in its end regions on the underside, i.e. on the side which faces the guide rail of the injection molding machine, which sliding elements in turn can receive forces at least in vertical direction. The sliding elements or else rolling elements which are used here are not part of the invention here. In the simplest embodiment, respectively at the front end or respectively at the rear end of the guide shoe on the underside of the main part of the guide shoe respectively a sliding element can be placed, whereby through the long distance between the sliding elements also a good linear guidance is ensured. Owing to the high weight forces which are to be received, in two-platen injection molding machines rollers are also usual instead of sliding elements.

The idea of the invention also includes providing more than two sliding- or respectively rolling elements on the underside of the guide shoe. It is immaterial for the idea of the invention whether the sliding/rolling elements can transfer forces only in vertical direction or also in horizontal direction. Usually, sliding devices will be provided, which run on guide rails, which can be stressed both horizontally (Y-axis) and also vertically (z-axis).

Purely for the simplified presentation of the guide shoe according to the invention, a horizontal guidance on an injection molding machine is described by way of example. However, for the specialist in the art, this example of usage is readily able to be transferred to other plastic processing machines, in particular vertical machines.

In the illustrated example of usage, the intended position of the guide shoe is that in which the main part is aligned with its longitudinal direction in X-direction of the machine and its width extent extends in Y-direction. Consequently, the thickness direction of the main part of the guide shoe corresponds to the Z-direction of the machine. Therefore, the sliding/rolling elements which are able to be arranged on the underside of the main part are placed in Z-direction at the lower end of the guide shoe. The end regions of the main part are therefore its end regions in X-direction of the plastic processing machine.

Owing to the elongated construction of the guide shoe or respectively of the main part of the guide shoe in X-direction, a high degree of parallelity is ensured between the fixed and the moving mold platen. A vertical misalignment between the two mold halves can be compensated by the guide shoes or respectively by the main body, because the latter is limited in Z-direction only downwards in its freedom of movement. Generally, the guide shoe with the sliding/rolling elements fastened thereon will only rest on the corresponding guide path, in a similar manner to a carriage on a railway track, wherein in most cases at the same time a guidance in Y-direction of the machine is provided. Therefore, a guide shoe according to the invention or respectively a combination of several guide shoes, can also be designated as a guide slide. The associated guide path is accordingly also designated as a guide rail.

Likewise, however, all established linear rail guides are conceivable at this point, which also permit a receiving of forces contrary to the direction of gravity (neg. Z-direction).

On the upper side of the main part, i.e. on the side of the main part facing away from the guide rail, in intended use of the guiding device according to the invention a vertical connecting element is provided, upwardly-directed in Z-direction, constructed as a deformation element. This vertical deformation element, which displays in particular a rib-like or respectively flange-like shape, has in an upper region a fixing region, arranged for example approximately centrally with respect to the longitudinal direction of the guide shoe, by which fixing region the guide shoe according to the invention can be connected with the moving mold platen. The guide shoe according to the invention is connected here exclusively by the fixing region with the moving mold platen. The deformation element preferably extends over almost the entire length of the main part and is aligned vertically with respect to the moving mold platen, arranged adjacent to the latter and only connected with the moving mold platen in an approximately central region with respect to the longitudinal extent of the deformation element.

The regions of the deformation element projecting beyond the fixing region are preferably constructed in the manner of a bridge and have respectively an end region. The end regions of the deformation element are connected with the end regions of the main part. The connection of the respective end regions here is torsion resistant, but flexurally elastic with respect to a bending axis parallel to the X-axis, which extends in the connecting region between main part and deformation element along the main part. High forces can be transferred via the end regions in vertical direction from the moving mold platen to the sliding elements or respectively to the guide rail of the machine.

Within the meaning of the invention, a deformation about the longitudinal axis of the guide path, i.e. about an axis parallel to the X-direction, is designated as a bend and a deformation about an axis parallel to the vertical axis (Z-axis) of the machine is regarded as twisting or respectively torsion.

A twisting of the end regions about a transverse axis of the plastic processing machine (Y-direction) is prevented by the projecting length of the deformation element or respectively of the main part of the guide shoe according to the invention.

Between the fixing region and the respective end regions of the deformation element, two center regions of the deformation element are provided according to the invention, which permit a torsion about a torsion axis parallel to the vertical axis of the injection molding machine and thus form a target torsion zone, in which deformations about a torsion axis T are absorbed. For this, the deformation element is constructed to be more flexible with regard to torsion (about the torsion axis T) relative to the main part. Here, the center regions can be constructed from webs in the manner of bridge arches, which connect the fixing region with the end region. The center regions can, however, also be configured as a continuous wall, which preferably takes up the entire height between the fixing region and the end region. Further preferred is a configuration of the center regions, in which webs in the manner of bridge arches in the upper region of the respective center region connect the fixing region with the respective end region. Intermediate walls can fix the bridge-like webs downwards in the direction towards the main part. Depending on the design requirement or else accessibility requirement for the moving mold platen, apertures can be provided in the center regions or respectively in the intermediate walls, which apertures co-determine the torsional elasticity and/or make other components on the moving mold platen accessible.

The plate-shaped deformation element, in turn, is connected in the lower region with the main part of the guide shoe according to the invention via a connecting region, wherein the connecting region is constructed to be more bending-flexible compared with the deformation element e.g. by a thinning of the wall thickness or by apertures. Through the relatively bending-flexible fixing of the deformation element, the plate-shaped deformation element can be bent about the bending axis B without unacceptably high forces or torques about an axis parallel to the X-axis being transferred to the guide rail.

Generally, it can be stated that with the guide shoe according to the invention, deformations owing to torsion are compensated in the deformation element, in particular in the center regions, and deformations owing to bending are compensated in the connecting region between deformation element and main part.

With the bendability of the deformation element in the connecting region about an axis parallel to the X-axis, also a slight misalignment of the two mold halves during the closing process of the mold is able to be compensated by the deformation element of the guide shoe according to the invention. Thereby, not only are the centering devices of the mold relieved, but especially also horizontal forces are kept away from the guide rails of the plastic processing machine, which leads to a greater stability of the devices participating in the guidance of the moving mold platen in X-direction.

With a closed injection mold, by introduction of the plastic material with injection molding pressure, the mold is deformed, whereby the two mold platens are deformed in a convex manner to a slight extent. With this convex deformation, the ends of the moving mold platen are also deformed, which with a rigid connection of the main part to the moving mold platen would be transferred to the sliding/rolling elements and therefore to the guide rail. This leads to damage to the guiding device for the moving mold platen, if these are not designed to be correspondingly robust. Such a robust, generally solid design of the elements participating in the guidance of the moving platen generally results, however, in large moving masses, which must be accelerated or respectively braked by drives of large configuration, if one wishes to avoid an extension of the cycle time.

According to the invention, the lower corners of the moving mold platen are received in a flexurally- and torsion-elastic manner by means of the guide shoe according to the invention, whereby the deformation of the moving mold platen which occurs on being acted upon by injection pressure does not affect, or only insignificantly affects, the main part. The deformation of the moving mold platen, in particular of the lower corners of the moving platen, is introduced here into the deformation element of the guide shoe according to the invention, whereby the deformation element bends about the connecting region between the main part inwards or outwards in Y-direction of the injection molding machine. In addition, the center regions of the deformation element will twist about a vertical axis (Z-axis). The deformation element is therefore likewise deformed on deformation of the moving mold platen, and namely to the extent in which the corners of the moving platen are moved by the deformation of the plate or respectively are altered in their position. The horizontal and vertical distance of the corners of the platen decreases in a convex deformation of the plate, wherein the corners at the same time undergo a twisting. Deviating from the known prior art, therefore according to the invention a deformation of the moving mold platen is to be permitted, wherein the deformation is received by the deformation element of the guide shoe and is not transferred via the main body to the sliding/rolling elements and therefore not to the guide paths.

These deflections and deformations of the corners on deformation of the moving mold platen can be compensated by the guide shoe according to the invention, in which the latter follows the movements in Y-direction and the twisting about the vertical axis, wherein the guide shoe is itself deformed in partial regions and therefore compensates the deformation of the moving platen. However, according to the invention the receiving regions for the sliding or respectively rolling elements are not, or are only insignificantly, deformed, whereby the stresses of the sliding/rolling elements and the guide rails are reduced to a tolerable extent and overloads are avoided. At the same time, the rigidity of the guide shoe against tilting about the Y-axis is maintained through the rigid connection of the end regions of the deformation element and of the main part. The deformability of the deformation element of the guide shoe according to the invention in fact therefore enables a decoupling of the mechanical deformations of the moving mold platen with respect to the guide rail of the injection molding machine. The geometric deformation of the mold platen is therefore already compensated by the guide shoe according to the invention and does not, as was usual in the prior art, have to be absorbed or respectively supported by the sliding elements and the guide paths.

With the application of the closing force and of injection molding pressure onto the two mold halves of the injection mold, as sufficiently known, the two mold platens are inevitably deformed, wherein deformations of the corners of the mold platens occur in the range of tenths of a millimeter, which is sufficient to already bring about damage to the sliding/rolling elements in conventional guide shoes after a few cycles.

Through the device according to the invention, such damage is avoided by the deformations of the corners of the moving platen being dissipated within the guide shoe.

Conventional compensation devices, such as e.g. that described in DE 41 41 259 A1, can compensate deformations only by translator displacements of the moving platen on the machine slide, whereby always a bending moment remains, which is transferred from the guide shoe to the sliding elements and from there to the guide rail.

The deformation element according to the invention can not only compensate translator displacements of the moving platen in the machine transverse axis or machine vertical axis, but can also receive deformations brought about by torsion and bending and keep them largely away from the sliding/rolling elements and the guide paths. The respective deformation element of a guide shoe according to the invention can follow the movement of the respective lower corner of the moving mold platen and thereby receive and dissipate tensions within the deformation element.

As the deformations are dissipated within the deformation element and the connecting region, the main part of the guide shoe according to the invention is almost completely decoupled from the deformations, whereby a long service life of the sliding/rolling elements and of the guide paths is achieved. It is therefore ensured that both during the travel movements and also on closing of the mold, the guide shoe according to the invention ensures an optimum platen parallelity.

Depending on the stress, i.e. the size of the moving mold platen or respectively of the mold half fastened thereon, the deformation element according to the invention can be additionally provided with one or more reinforcing ribs. Such reinforcing ribs are preferably constructed parallel to the main part and project with respect to the plate-shaped deformation element in transverse direction of the machine. Such an approximately horizontal reinforcing rib in normal use of the guide shoe according to the invention then lies in the tension fiber region of the guide shoe according to the invention for the supporting of forces which result from an accelerating or braking of the moving mold platen.

Preferably, such a reinforcing rib, which makes the deformation element sufficiently rigid to receive the weight force of the mold platen and of the mold, is arranged in the region of the deformation element close to the main part, i.e. in the position of use at the bottom on the deformation element, but above the connecting region. Such a reinforcing rib extends in longitudinal direction preferably at least over the entire center region of the deformation element, preferably into the end regions of the deformation element.

When such a reinforcing rib is provided, the torsion-flexible region is situated above the reinforcing rib, and the bending-flexible region of the deformation element or respectively of the guide shoe according to the invention is situated beneath the connecting rib. Therefore, such a reinforcing rib can also be regarded as a separating element between the torsion region and the bending region. The torsion-flexible region is then formed by the fixing region and the center regions of the deformation element.

Preferably, the deformation element will be constructed in one piece together with the bending-flexible connecting region and the main part, wherein regions between the end regions of the deformation element, i.e. in the center region of the deformation element, can have apertures. Such apertures can be placed into different regions for configuring the torsional rigidity or respectively the flexural rigidity of the deformation element.

According to the invention, therefore, substantially only the center regions of the deformation element are deformed, wherein the fixing region of the deformation element with the moving mold platen is preferably flexurally rigid and torsionally rigid.

For the reliable receiving of the vertical (weight) forces, the deformation element according to the invention can be constructed for example in the manner of a bridge arch, wherein webs connect the two end regions of the deformation element and receive the fixing region. The two end regions of the deformation element then project upwards from the main part in a similar manner to bridge piers in the position of use of the guide shoe according to the invention. On the underside of the main part of the guide shoe according to the invention, usually the sliding elements or respectively rolling elements are fastened, which can run on the guide rails of the machine in a friction-reduced manner.

In a preferred example embodiment, the fixing region for the usual mold platen is arranged approximately centrally in longitudinal direction of the guide shoe according to the invention, so that acceleration- and deceleration forces which occur on opening and closing of the mold can be received symmetrically. However, preferably in the case of large molds, i.e. with high acceleration- or respectively deceleration forces, the fixing region for the moving platen can be placed at the rear, i.e. away from the fixed mold platen. Preferably, such an asymmetrical solution will be used when drive means for moving the moving platen are applied, which can receive the forces in X-direction on accelerating/decelerating of the movement of the moving platen. For example, a greater lever is thus available for the receiving of tilting moments of the moving mold in the direction of the fixed mold. An asymmetrical construction of the guide shoe according to the invention in longitudinal direction of the injection molding machine can, however, also be structurally determined.

For the realization of the idea of the invention, a connecting region is provided in the transition region from the approximately horizontal upper side of the main part to the approximately vertical, plate-shaped deformation element, which connecting region enables a bending of the elastic deformation element about an axis parallel to the longitudinal (X-axis) of the machine. This connecting region, which is also constructed elastically, can be arranged here as a solid material between the respective end regions of the main part and of the deformation element.

Preferably, as means of the adjustability of the elasticity of the bending of the guide shoe according to the invention, apertures can be provided in this connecting region, which can be adapted structurally to the expected stresses by deformation of the moving mold platen. Preferably, the bending region, i.e. the connecting region between main part and deformation element, is limited upward by the reinforcing rib which has already been mentioned above, which projects horizontally from the elastic deformation element.

In the configuration of the guide shoe according to the invention in a single piece, such a guide shoe can be produced for example from spheroidal graphite cast iron (GGG). To fulfill the idea of the invention, however, a two- or multiple-part configuration of the guide shoe according to the invention is also conceivable, wherein the individual components can be screwed or welded to one another. Preferably, if one expects great different material characteristics between the individual regions of the guide shoe according to the invention, different materials will be used.

According to a further preferred embodiment, the guide shoe according to the invention can also be constructed in several parts as a mounted guide shoe, in which individual components, for example the main part, the deformation element etc. are assembled by means of force- and/or form-fitting connecting techniques, for example by means of screws or by pinned fittings. It is essential that no joint-like devices are provided, in order to perform compensation movements. In the guide shoe according to the invention, all deformations which occur are absorbed elastically in the target bending zones and/or torsional bending zones specifically provided for this and constructed for this.

However, it is essential for fulfilling the idea of the invention that deformations which can occur in the moving mold platen can be received by the deformation element, i.e. a deformable region of the guide shoe, and tensions and deformations are not transferred to the main part, which would result in a passing on of the forces or respectively deformations to sliding elements or respectively to the guide rail.

BRIEF DESCRIPTION OF THE DRAWING

A preferred embodiment is described in detail below by way of example, as a representative for further embodiments, wherein FIGS. 1 to 5 present the guide shoe according to the invention in various views with various details. Here, identical elements bear the same reference numbers. There are shown:

DETAILED DESCRIPTION OF PREFERRED EMBODIMENTS

Figure 1:
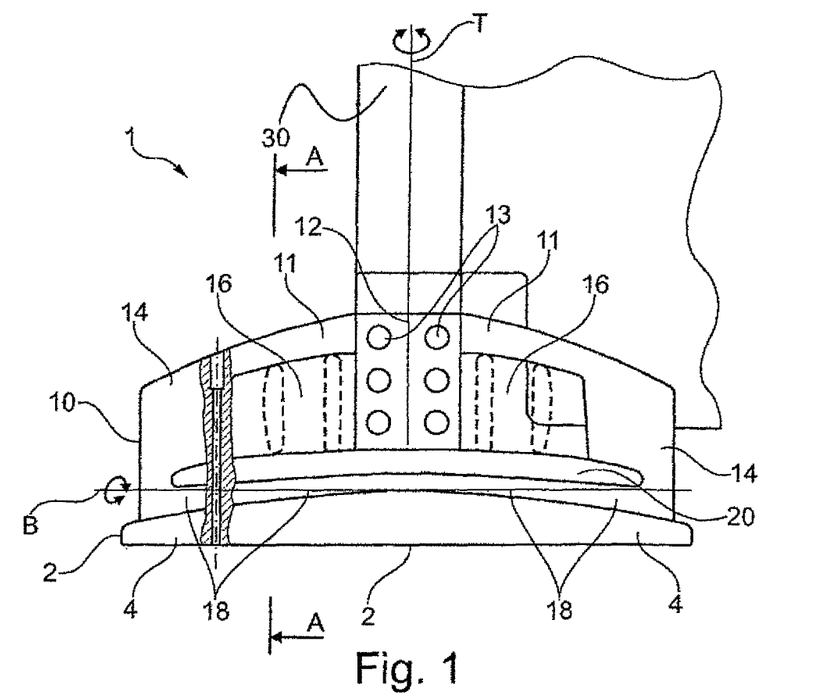
FIG. 1: diagrammatically a guide shoe according to the invention, in side view.

FIG. 1 shows in a side view a guide shoe 1 according to the invention, wherein the longitudinal extent corresponds to the longitudinal direction (X-direction) of an injection molding machine. The guide shoe illustrated in FIG. 1 has a main part 2, which in the position of use of the guide shoe 1 is situated in the lower region of the guide shoe 1 and on which a deformation element 10 is arranged going upward in vertical direction, which is connected via end regions 14 with end regions 4 of the main part 2. By way of example, fixing bores 5 for sliding/rolling elements (not shown) are illustrated in the end regions 4 of the main part. Between the end regions 4 of the main part 2 there is situated the center region 6 of the main part 2, which is connected via a connecting region 18 with center regions 16 of the deformation element 10. The connecting region 18 is constructed as a target bending zone for a bending of the deformation element about a bending axis B. Between the two center regions 16 of the deformation element 10 a fixing region 12 is arranged for the fixing of the guide shoe to a moving mold platen 30. The two center regions 16 of the elastically deformable deformation elements 10 can be spanned here with webs 11 in the manner of bridge arches, which connect the fixing region 12 with the end regions 14. In the example embodiment according to FIG. 1, a reinforcing rib 20 is arranged beneath the fixing region 12, which reinforcing rib extends in longitudinal direction parallel to the main part 2. A bending axis B, about which the deformation element 10 can bend with respect to the main part 2, runs approximately horizontally through a connecting region 18.

Figure 2:
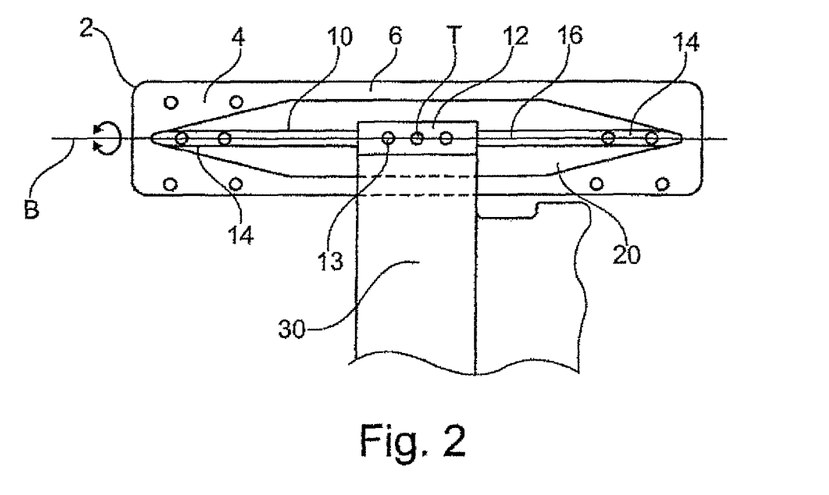
FIG. 2: diagrammatically a guide shoe according to the invention in top view from above.

FIG. 2 shows from above the optional reinforcing rib 20 also illustrated in FIG. 1, whereby it can be seen that the reinforcing rib 20 projects approximately perpendicularly in transverse direction (Y-direction) of the injection molding machine from the deformation element 10. FIG. 2 additionally shows in the fixing region 12 a proposal for a fixing of the moving platen 30.

Beneath the reinforcing rib 20, which is arranged approximately surface-parallel to the main part 2, a flexurally elastic connecting region 18 adjoins, starting from the two end regions 14, beneath the center regions 16 or respectively the fixing region 12. The flexurally elastic connecting region 18 has a reduced wall thickness or has apertures. Hereby it is achieved that the connecting region 18 is constructed to be more bending-flexible relative to the deformation element 10. Such apertures are indicated in FIG. 1 by the dashed line in the connecting region 18. The bending axis B, which is arranged in the connecting region 18, runs according to FIG. 2 parallel to the X-axis.

Like the connecting region 18, the center regions 16 of the elastic deformation element 10 can also have thinned regions beneath the bridge-like webs 11. However, apertures are also feasible in the center regions 16 for achieving a particular desired torsion-flexibility about the torsion axis T. Such apertures are illustrated in FIG. 1 by dashed lines. The torsion axis T is illustrated as a perpendicular line approximately parallel to the Z-axis.

Figure 3:
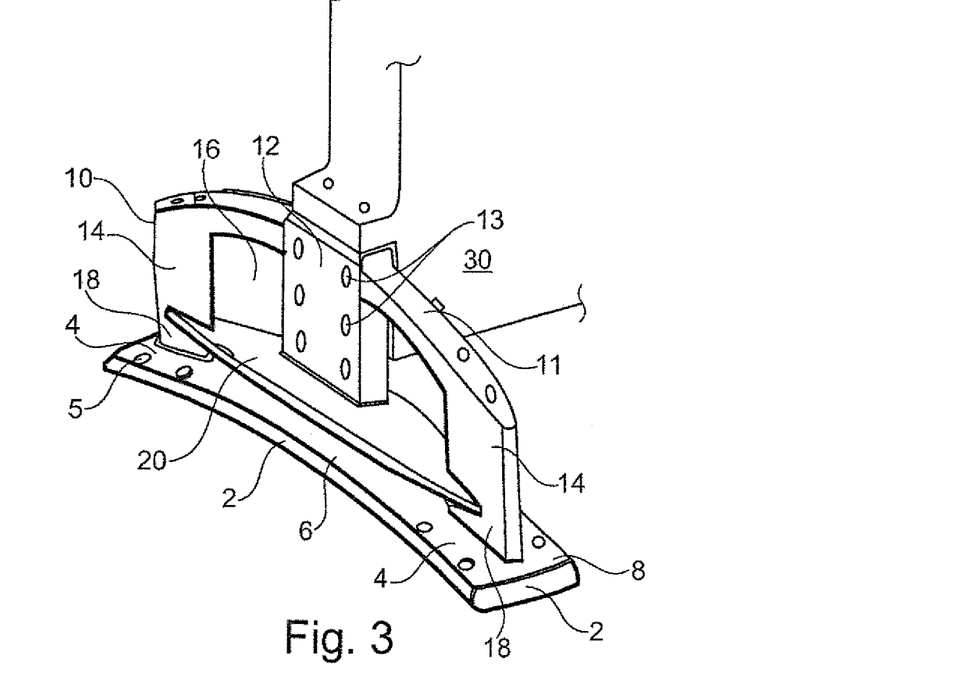
FIG. 3: diagrammatically a guide shoe according to the invention in 3-dimensional representation.

In FIG. 3 the preferred embodiment of FIGS. 1 and 2 is shown diagrammatically in an isometric illustration, wherein here also identical elements or respectively regions bear the same reference numbers.

In contrast to the example embodiment according to FIG. 1, the example embodiment according to FIG. 3 shows an aperture in the center region 16 of the deformation element 10 beneath the connecting webs 11, in the manner of bridge arches, between the end regions 14 and the fixing region 12. The connecting webs in the manner of bridge arches therefore form together with the two end regions and the fixing region the deformation element 10 in the manner of a bridge arch. As already indicated above, the optional reinforcing rib 20 can be readily seen from FIG. 3, wherein also its function, the delimitation of the torsion region of the deformation element, is illustrated in the direction of the main part.

Figure 4:
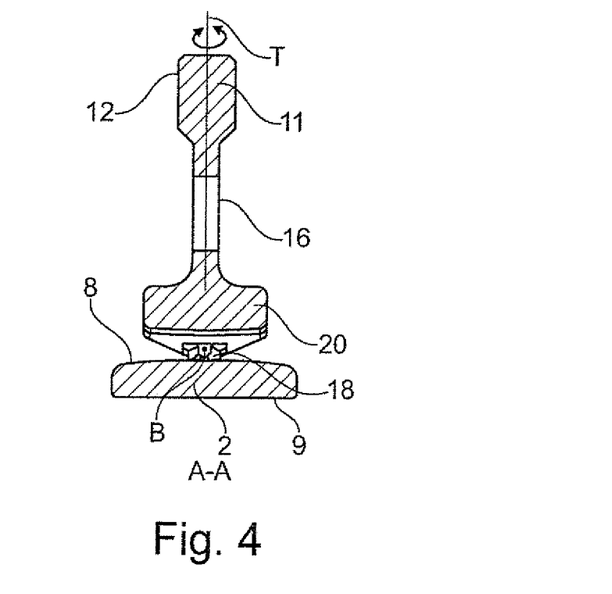
FIG. 4: diagrammatically a vertical section through a guide shoe according to the invention, in accordance with FIG. 1.

In FIG. 4 for further illustration of the guide shoe according to the invention a vertical section through the guide shoe according to FIG. 1 is shown, wherein the section line runs through a center region 16 of the deformation region 10. The configuration of the web-like bridge arch elements 11 between the end regions 14 and the fixing region 12 of the deformation element 10 can be clearly seen in the section according to FIG. 4. The torsion axis T was moved into the section plane for better presentability and runs approximately vertically. The bending axis can be seen as point B in the connecting region 18.

In addition, an aperture in the center region 16 can be seen in the region between the reinforcing rib 20 and the web-like bridge elements 11. Furthermore, in the sectional illustration according to FIG. 4 the flexurally elastic connecting region 18 of the deformation element 10 to the main part 2 can be readily seen. At the same time, an upper side 8 of main part 2 is indicated in FIG. 4, which upper side points towards the deformation element 10. The underside 9 of the main part 12, lying opposite the upper side 8, serves to receive sliding/rolling elements which are not shown.

Figure 5:
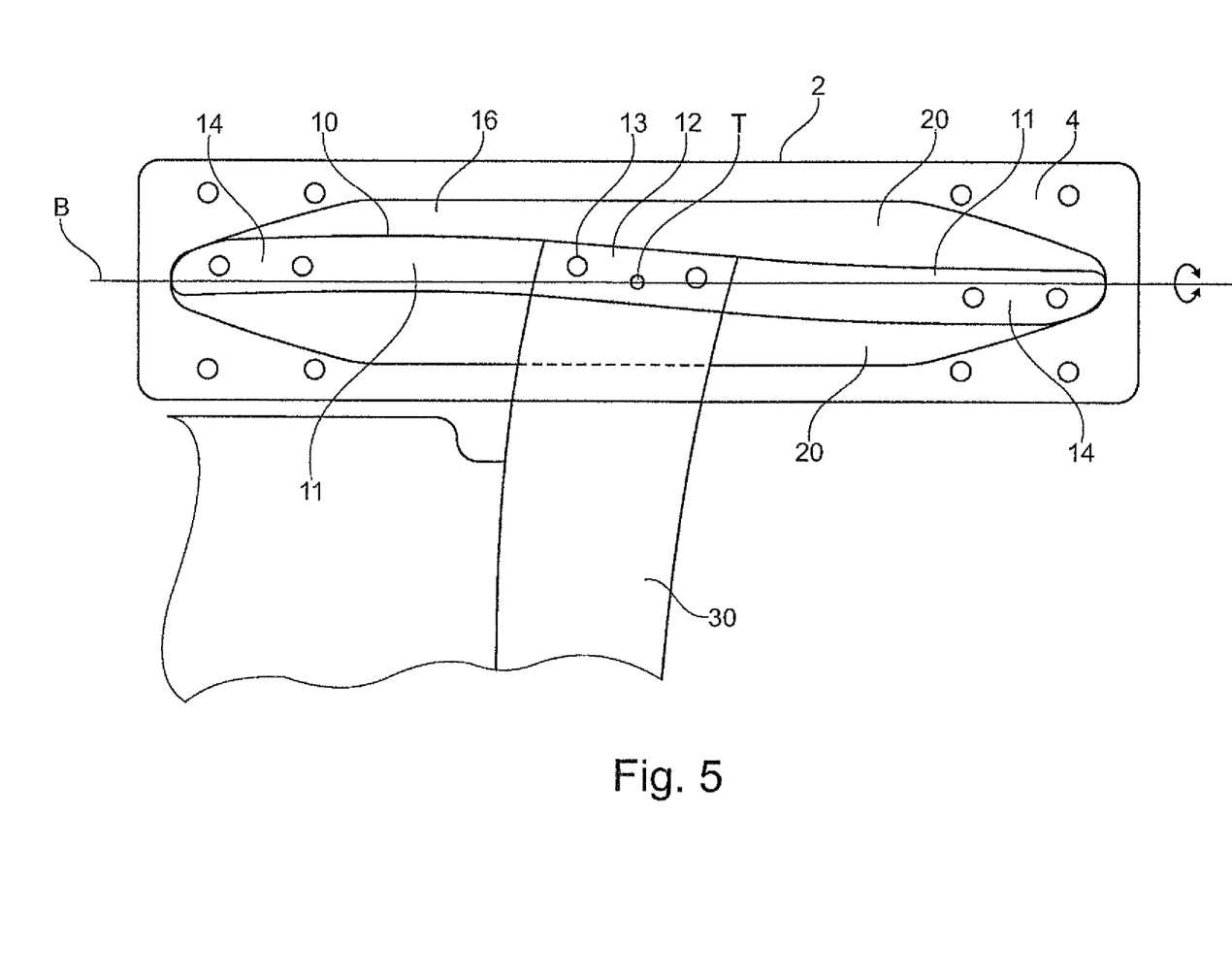
FIG. 5: diagrammatically a guide shoe according to the invention in top view in deformed state.

The non-deformed guide shoe 1 illustrated in FIGS. 1 to 4 is shown in FIG. 5 in the deformed state, i.e. in a state bent towards the center of the machine and in a twisted state about the torsion axis T. For better orientation and for clarification of the deformed state, FIG. 5 shows a portion of a deformed moving mold platen 30 in disproportionate form.

The mold platen 30 has here a convex deformation pointing away from the fixed mold platen, which results in a 3-dimensional displacement of the respective lower corner of the moving platen. Such a crowned or respectively convex deformation of the moving mold platen 30 is compensated or respectively absorbed by the elastic deformation element 10 of the guide shoe 1 according to the invention. This takes place by the bridge-like webs 11 or respectively the center regions 16 of the deformation element, as illustrated in FIG. 5, being bulged in opposite directions and forming the s-shaped form of the deformation element 10 shown in FIG. 5. At the same time, the deformation element 10 is bent to the side about the bending axis B which leads through the connecting region 18.

As is further illustrated according to the invention in FIG. 5, no or almost no deformation or respectively bending is transferred onto the main part 2 on the deformation of the deformation element 10 with its center regions 16 and the reinforcing rib 20.

As the convex deformation of the moving mold platen 30 only occurs on application of the closing force and of the injection pressure, and the guide shoe 1 according to the invention is constructed so as to be rigid in longitudinal direction, the guide shoe according to the invention fulfills all the requirements placed on it with regard to a good parallel guidance of the moving mold platen 30 with respect to the fixed mold platen and also a good parallelity of the two mold platens during the mold closing process.

What is claimed is:

1. A guide shoe of a guiding device of a plastic processing machine clamping unit for supporting and guiding a moving mold platen in a clamping direction of the plastic processing machine, said guide shoe comprising:
   a main part which is elongated in the clamping direction and configured for attachment of sliding or rolling elements; and
   a connecting element spaced from the main part and extending substantially vertical in the clamping direction (x-direction), said connecting element having a fixing region configured for attachment of the moving mold platen in a decoupled manner from the main part, said connecting element designed as a deformation element having a connecting region to secure the deformation element to the main part and to form a target bending zone with respect to a bend about a bending axis extending in a substantially parallel relation to the clamping direction, said deformation element forming a target torsion zone about a torsion axis extending in substantially perpendicular relation to the clamping direction.

2. The guide shoe of claim 1, wherein the deformation element has a ribbed or flanged configuration.

3. The guide shoe of claim 1, wherein the fixing region is arranged in a longitudinal direction of the guide shoe.

4. The guide shoe of claim 1, wherein the fixing region is arranged in a longitudinal direction approximately centrally on the connecting element.

5. The guide shoe of claim 1, wherein the connecting region has at least one aperture to provide an enhanced bending-flexible configuration.

6. The guide shoe of claim 1, wherein the connecting region has at least one area defined by a wall thickness which is smaller than a wall thickness of a remaining area of the connecting region.

7. The guide shoe of claim 1, wherein the deformation element has at least one reinforcing rib which extends in a longitudinal direction of the main part and projects horizontally on both sides of the deformation element, when the guide shoe assumes an intended position of use.

8. The guide shoe of claim 1, wherein the connecting element has a center region, arranged in a longitudinal direction of the connecting element adjacent to the fixing region, and webs configured to span the center region and to connect end regions of the deformation element with the fixing region of the deformation element, thereby providing an enhanced torsion-flexible configuration.

9. The guide shoe of claim 8, wherein the center region has a wall thickness which is smaller that a wall thickness of the webs to provide an enhanced torsion-flexible configuration.

10. The guide shoe of claim 9, wherein the center region has an aperture.

11. The guide shoe of claim 1, constructed in one piece as a cast part, forged part or welded construction, or constructed in several parts as fixedly connected components by a form fit or interference fit in the absence of an articulated connection.

12. A guiding device of a clamping unit of a plastic processing machine for supporting and guiding a moving mold platen in a clamping direction of the plastic processing machine, said guiding device comprising at least one guide shoe having a main part which is elongated in the clamping direction and configured for attachment of sliding or rolling elements, and a connecting element spaced from the main part and extending substantially vertical in the clamping direction (x-direction), said connecting element having a fixing region configured for attachment of the moving mold platen in a decoupled manner from the main part, said connecting element designed as a deformation element having a connecting region to secure the deformation element to the main part and to form a target bending zone with respect to a bend about a bending axis extending in a substantially parallel relation to the clamping direction, said deformation element forming a target torsion zone about a torsion axis extending in substantially perpendicular relation to the clamping direction.

13. A plastic processing machine, comprising a clamping unit for supporting and guiding a moving mold platen in a clamping direction, said plastic processing machine comprising at least one guiding device which includes at least one guide shoe having a main part which is elongated in the clamping direction and configured for attachment of sliding or rolling elements, and a connecting element spaced from the main part and extending substantially vertical in the clamping direction (x-direction), said connecting element having a fixing region configured for attachment of the moving mold platen in a decoupled manner from the main part, said connecting element designed as a deformation element having a connecting region to secure the deformation element to the main part and to form a target bending zone with respect to a bend about a bending axis extending in a substantially parallel relation to the clamping direction, said deformation element forming a target torsion zone about a torsion axis extending in substantially perpendicular relation to the clamping direction.

\* \* \* \* \*